United States Patent
Schlee et al.

(10) Patent No.: US 9,584,199 B2
(45) Date of Patent: Feb. 28, 2017

(54) USER GROUP SPECIFIC BEAM FORMING IN A MOBILE NETWORK

(75) Inventors: Johannes Schlee, Ulm (DE); Martin Weckerle, Ulm (DE)

(73) Assignee: KATHREIN-WERKE KG, Rosenheim (DE)

( * ) Notice: Subject to any disclaimer, the term of this patent is extended or adjusted under 35 U.S.C. 154(b) by 632 days.

(21) Appl. No.: 12/563,638

(22) Filed: Sep. 21, 2009

(65) Prior Publication Data
US 2011/0070822 A1    Mar. 24, 2011

(51) Int. Cl.
| H04W 72/00 | (2009.01) |
| H04B 7/04 | (2006.01) |
| H04B 7/06 | (2006.01) |
| H04B 7/26 | (2006.01) |

(52) U.S. Cl.
CPC ......... H04B 7/0452 (2013.01); H04B 7/0617 (2013.01); H04B 7/2606 (2013.01)

(58) Field of Classification Search
USPC ... 455/450–455, 17, 25, 13.3; 342/350, 354, 342/359, 367, 368, 373, 374
See application file for complete search history.

(56) References Cited

U.S. PATENT DOCUMENTS

| 4,858,225 A | 8/1989 | DeSantis |
| 5,448,621 A | 9/1995 | Knudsen |
| 5,657,323 A | 8/1997 | Jan et al. |
| 5,790,534 A | 8/1998 | Kokko et al. |
| 5,886,988 A | 3/1999 | Yun et al. |
| 5,924,015 A | 7/1999 | Garrison et al. |

(Continued)

FOREIGN PATENT DOCUMENTS

| EP | 1819088 | 8/2007 |
| WO | 99/17576 | 4/1999 |

OTHER PUBLICATIONS

3rd Generation Partnership Project; Technical Specification Group Radio Access Network; Multiple Input Multiple Output in UTRA, published before Sep. 21, 2009, 76 pages.

(Continued)

*Primary Examiner* — Fayyaz Alam
(74) *Attorney, Agent, or Firm* — Stephen H. Eland; Dann, Dorfman, Herrell & Skillman

(57) ABSTRACT

The present disclosure relates to a radio system (1), a base band unit (20) and a method (100) for relaying radio signals in a cell (101) of a mobile network. The radio signals are relayed according to a service criterion (300). With the present invention the radio signals are grouped into a grouped payload signal (30-1, 30-2, ..., 30-M) and a grouped receive signal (220-1, 220-2, ..., 220-M) according to the service criterion (300). The grouped payload signal (30-1, ..., 30-M) and the grouped receive signal (220-1, 220-2, ..., 220-M) are associated with a beam forming vector (40-1, 40-2, ..., 40-M). The grouping according to the present disclosure helps to improve a quality of service provided to an individual user of the mobile network. The associated beam forming vector (40-1, 40-2, ..., 40-M) may be provided and adjusted at a digital radio interface DRI (200). Furthermore the present disclosure provides various computer programme product implementing the various aspects.

34 Claims, 7 Drawing Sheets

(56) References Cited

U.S. PATENT DOCUMENTS

| | | | |
|---|---|---|---|
| 5,960,354 A | 9/1999 | Einola | |
| 5,963,865 A | 10/1999 | Desgagne et al. | |
| 6,055,431 A | 4/2000 | Dybdal | |
| 6,233,466 B1 | 5/2001 | Wong et al. | |
| 6,269,242 B1 | 7/2001 | Leopold et al. | |
| 6,282,434 B1 | 8/2001 | Johannisson et al. | |
| 6,438,354 B2 | 8/2002 | Thompson et al. | |
| 6,463,303 B1 * | 10/2002 | Zhao | 455/562.1 |
| 6,606,482 B1 | 8/2003 | Wheeler | |
| 6,697,619 B1 | 2/2004 | Hogberg et al. | |
| 6,844,844 B1 | 1/2005 | Aguttes | |
| 6,862,269 B1 | 3/2005 | Nasta | |
| 7,379,707 B2 * | 5/2008 | DiFonzo et al. | 455/12.1 |
| 7,408,507 B1 | 8/2008 | Paek et al. | |
| 7,613,232 B2 | 11/2009 | Meir et al. | |
| 7,653,416 B2 | 1/2010 | Washiro | |
| 7,668,509 B2 | 2/2010 | Greeley | |
| 7,970,345 B2 | 6/2011 | Cummiskey | |
| 8,060,076 B2 | 11/2011 | Shiver et al. | |
| 8,223,821 B2 | 7/2012 | Hannan et al. | |
| RE44,173 E | 4/2013 | Noll et al. | |
| 8,432,805 B2 | 4/2013 | Agarwal | |
| 8,432,929 B2 | 4/2013 | Wilson et al. | |
| 8,433,332 B2 | 4/2013 | Agarwal | |
| 8,442,432 B2 | 5/2013 | Agarwal | |
| 8,634,296 B2 | 1/2014 | Agarwal | |
| 8,660,165 B2 | 2/2014 | Hannan et al. | |
| 8,705,560 B2 | 4/2014 | Wilson et al. | |
| 8,712,337 B2 | 4/2014 | Shiver et al. | |
| 8,977,309 B2 * | 3/2015 | Schmidt et al. | 455/507 |
| 2003/0153316 A1 | 8/2003 | Noll et al. | |
| 2004/0224637 A1 | 11/2004 | Silva et al. | |
| 2005/0148840 A1 | 7/2005 | Lazenby | |
| 2007/0149250 A1 * | 6/2007 | Crozzoli et al. | 455/562.1 |
| 2007/0223423 A1 * | 9/2007 | Kim et al. | 370/334 |
| 2008/0045143 A1 | 2/2008 | Yoshida et al. | |
| 2008/0198793 A1 | 8/2008 | Lysejko et al. | |
| 2008/0219194 A1 * | 9/2008 | Kim et al. | 370/310 |
| 2008/0240031 A1 | 10/2008 | Nassiri-Toussi et al. | |
| 2008/0242332 A1 | 10/2008 | Suh et al. | |
| 2008/0254752 A1 | 10/2008 | Oh et al. | |
| 2009/0058725 A1 | 3/2009 | Barker et al. | |
| 2009/0196362 A1 * | 8/2009 | Song et al. | 375/260 |
| 2009/0201214 A1 | 8/2009 | Falk | |
| 2010/0098105 A1 * | 4/2010 | Hung et al. | 370/431 |
| 2010/0240313 A1 | 9/2010 | Kawal | |
| 2010/0261440 A1 * | 10/2010 | Corman et al. | 455/91 |
| 2011/0105170 A1 * | 5/2011 | Gan et al. | 455/509 |
| 2011/0223925 A1 * | 9/2011 | Gale et al. | 455/450 |
| 2012/0184229 A1 * | 7/2012 | Corman et al. | 455/127.2 |

OTHER PUBLICATIONS

Viswanath et al., Opportunistic Beamforming Using Dumb Antennas, IEEE Transactions on Information Theory, ISSN: 0018-9448, Jun. 2002, vol. 48, No. 6, pp. 1277-1294.

Viswanath et al., Opportunistic Communication: A New System Design, www.stanford.edu/class/ee360/lecture8_wonchae.ppt, IT 2002.

International Preliminary Report and Written Opinion issued in PCT/EP10/63924 on Apr. 5, 2012.

* cited by examiner

USER GROUP SPECIFIC BEAM FORMING IN A MOBILE NETWORK

CROSS REFERENCE TO OTHER APPLICATIONS

The present application is related to U.S. patent application Ser. No. 12/563,693 entitled ; "Antenna Array, Network Planning System, Communication Network and Method for Relaying Radio Signals With Independently Configurable Beam Pattern Shapes Using a Local Knowledge", filed Sep. 21, 2009. The entire disclosure of the foregoing application is incorporated herein by reference.

FIELD OF THE INVENTION

The field of the present invention relates to a radio system for relaying radio signals in a cell of a mobile network. The present invention further relates to a method for relaying radio signals in a cell of a mobile network. The field of the present invention also relates to a base band unit providing a plurality of grouped payload signals. Furthermore the field of the present invention relates to a computer program product enabling a processor to carry out the manufacture of the radio system for relaying radio signals in a cell of a mobile network and a computer program product enabling a processor to carry out the manufacture of the base band unit as well as a computer program product enabling a processor to carry out the method for relaying radio signals in a cell of a mobile network.

BACKGROUND OF THE INVENTION

A use of mobile communications networks has increased over the last decade. Operators of mobile communication networks have increased a number of base stations in order to meet an increased request for service by users of the mobile communications networks. The base stations typically comprise radio systems for relaying radio signals within a cell of the mobile communications network. It is of interest for the operators of the mobile network to reduce the running costs of the base stations. It is one option to implement the radio system of the base station as an antenna embedded radio system in order to reduce the running costs of the base station. Implementing the radio system of the base station as the antenna embedded radio station reduces a space needed to house the hardware of the base station. Implementing the radio system as an antenna embedded radio system may comprise implementing some of the hardware components of the radio system on a chip. Substantially all hardware components of the radio system may be implemented on the chip, when implementing the radio system as the antenna embedded radio system. The space needed to house the antenna embedded radio system is substantially reduced. Typically an active antenna system, i.e. an antenna array comprising a plurality of antenna elements is not included on the chip. A power consumption during normal operation of the radio system is substantially reduced when implementing the radio system on the chip.

It is of interest to provide a reliable quality of service to an individual user of the mobile network given the increase of the number of users of the mobile network. Furthermore the number of users of the mobile network within the cell of the mobile network has increased concomitant to the increase of the number of users of the mobile network.

A radio signal relayed by the radio system located at the base station maybe repeatedly scattered before reaching the user. In other words there are several paths along which the radio signals may travel when reaching the user. Constructive and destructive interferences may occur in situations wherein the radio signals may reach the user along a plurality of paths. Whereas the constructive interference may be of advantage and help improving the quality of service provided to the individual user, the destructive interference will undoubtedly deteriorate the quality of service provided to the individual user.

Several techniques have been suggested in order to deal with the increased number of the users within the mobile network and hence within the cell of the mobile network. Time division multiplexing architectures (TDMA) were suggested as well as frequency multiplexing strategies. Unfortunately both multiplexing techniques are not adapted to compensate the effect of the destructive interferences users experience within the cell of the mobile network. In other words the plurality of paths along which the radio signals travel to reach the user is not eliminated by using the multiplexing schemes.

Typically, the radio station relays the radio signals to a plurality of users within the cell of the mobile network. The individual user will experience the radio signals relayed to other users within the cell as a background noise to the radio signal that is dedicated to the individual user.

A direct line of sight between the radio system and the user with no destructive interference is an ideal condition to provide the best possible quality of service to the individual user.

A scheme of opportunistic beam forming is known in the art. Opportunistic beam forming requires all handsets (of the users) to report a quality of service to the radio system located at the base station. Therefore contemporary protocols of mobile communication such as UMTS (short for Universal Mobile Telecommunications System or HSDPA (short for High Speed Downlink Package Access) allow for a pilot data package to be transmitted to all the users. In response the handsets will measure a signal to interference and noise ratio (SINR) for the pilot data packet and return the SINR value back to the radio system. The radio system will then relay the radio signal intended for the user with the optimal SINR conditions. It may appear unfair to select the individual user being served by the radio system as the user with the optimal SINR value. The optimal SINR of the individual user corresponds to a direct line of sight between the individual user and the radio system. With a plurality of users present within the cell of the mobile network and the users being mobile within the cell, the concept of opportunistic beam forming theoretically reaches the limit of a data throughput defined by a direct line of sight to each one of the individual users.

The opportunistic beam forming requires a sufficiently large number of users in order to be fair. Furthermore fluctuations of the SINR help the opportunistic beam forming to be fair and to reach the limit of the data throughput defined by the direct line of sight to each one of the individual users. With the opportunistic beam forming the radio system just addresses the user that currently has the optimal SINR, hence the name opportunistic beam forming For a detailed introduction to opportunistic beam forming see "Opportunistic Beamforming Using Dumb Antennas" by P. Viswanath, D. Tse, R. Laroia in IEEE Transactions on information Theory, vol. 48, No. 6, June 2002.

The advent of high speed data services in mobile networks creates new challenges for the system operators. It is now necessary for the radio system to provide the radio signals according to very different transfer protocols depending on whether the radio signals comprise voice communication or high speed data communications.

Opportunistic beam forming as in the prior art requires substantial changes to the hardware of the radio system in order to reduce an effect of destructive interferences within the cell of the mobile network.

SUMMARY OF THE INVENTION

A radio system for relaying radio signals in a cell of a mobile network comprises: a base band unit and an active antenna system. The base band unit generates a plurality of grouped payload signals from a payload signal. The active antenna system comprises a plurality of antenna elements. The active antenna system relays the plurality of the payload signals according to an associated beam forming vector. The grouped payload signals are grouped according to a service criterion. The active antenna system is adapted to relay the plurality of the grouped payload signals. The grouped payload signals are relayed according to an associated beam forming vector. The associated beam forming vector may be varying in time.

The associated beam forming vector comprises factors for at least one of the antenna elements. The factors provide a delay or phase and amplitude weighting for at least one of the antenna elements. An individual one of the factors is associated to an individual one of the antenna elements. The factors can be selected independently. This means a selection of one of the factors does not affect a selection of a second one of the factors.

The associated beam forming vector may be different for an uplink relaying and for a downlink relaying of the radio system. The uplink relaying comprises a communication from a handset of a user to the radio system. The downlink relaying of the radio system comprises communications from the radio system to at least one of the users of the mobile communication system. The associated beam forming vector may be varying in time.

It is to be understood that the factors of the associated beam forming vector provides a wider freedom in shaping a beam relayed by the radio system. In the prior art passive delay or phase shifting networks have been used for a beam forming Providing the factors, one of the factors for at least one of the antenna elements allows a convenient way of shaping beams relayed by the radio system, be it in the uplink relaying and/or the downlink relaying. It is further to be understood that the antenna elements of the radio system may be subdivided into subsets of the antenna elements. The subsets of the antenna elements may be associated with a subset beam forming vector. The subset of the antenna elements allows relaying more than one beam at a time. Another way of looking at a the subset of the antenna elements is to apply a set of factors such that an individual one of the factors is associated with an individual one of the antenna elements. The set of factors may then yield a beam complicated beam shape comprising more than one regions of maximal energy relayed by the radio system.

The payload signal is typically provided in a base band frequency. Without any limitation the payload signal may be provided at an intermediate frequency. The intermediate frequency may be any frequency between the base band frequency and a frequency of transmission of the radio system.

The service criterion may for example comprise at least one of a transmit power requirement, data rates in data services, voice communication and common channels required. For example the users holding a voice communication could be grouped in a first group within the cell. The users holding a data connection could be grouped in a second group. It will be apparent to a person skilled in the art that more than two groups may be defined according to the service criterion. It is understood as well that further service criterions are conceivable.

The term relaying as used herein shall be construed as comprising a transmitting as well as a receiving of radio signals. The receiving of the radio signals is commonly referred to as Rx. The transmitting of the radio signals is commonly referred to as Tx.

According to a further aspect a method for relaying radio signals in a cell of a mobile network is provided. The method comprises a providing of a payload signal. The method further comprises generating a plurality of grouped payload signals. The generating of the grouped payload signals is based on the service criterion. The method further comprises a selecting of a beam forming vector. The method further comprises a transmitting of a selected one of the plurality of the grouped payload signals according to the beam forming vector selected. The associated beam forming vector comprises the factors. The factors represent the beam forming vector. The factors may comprise a delay added to at least one of the antenna elements of the active antenna system. Additionally or alternatively the factors may comprise phase and amplitude weightings to at least one of the antenna elements of the active antenna system. The the term "delay or phase and amplitude weighting" is to be construed as comprising the amplitude and phase weighting and/or the delay added to at least one of the antenna elements. It will be appreciated that the delay may be of interest with respect to location based services, since, for example, it will allow a location of a position of the user to be calculated using triangulation techniques.

In other words the associated beam forming vector is associated to at least one of the grouped payload signals. The associated beam forming vector comprising the factors allows a way more flexible method of shaping the beam relayed by the radio system. Beam shaping, as known in the prior art, used passive delay or phase shifting networks. Once these passive delay or phase shifting networks are set up, the passive delay or phase shifting networks can merely amend the delay or phase and amplitude changes applied to radio signals being relayed by the active antenna system. The associated beam forming vector may be provided at the digital radio interface (DRI). The beam forming vector information is than communicated from the DRI, for example, using one of the control channels, to the active antenna system. It is to be understood that the beam forming vector may be adjusted at the DRI. Therefore additionally to the payload signal it may be of interest to provide the beam forming vector to the DRI.

The method further comprises receiving a selected one of a plurality of grouped receive signals. The grouped receive signals are saved according to the method. The grouped receive signals are counted according to the method. The method further comprises combining a combined receive signal from the grouped receive signals saved.

The combined receive signal comprises all received signals from all user groups within the cell of the mobile network.

The present disclosure provides a base band unit adapted to generate a plurality of grouped payload signals from a payload signal. The base band unit comprises a splitting unit, a first switch wherein the plurality of the grouped payload signals is generated according to a service criterion. The base band unit comprises a splitting unit and a first switch.

The splitting unit is adapted to split the payload signal into the plurality of the grouped payload signals. The first switch is adapted to switch between individual ones of the plurality of the grouped payload signals. The plurality of the grouped payload signals is generated according to the service criterion. The base band unit may furthermore comprise a combining unit. The combining unit is adapted to form a combined receive signal from at least one of the plurality of the grouped receive signals. It may be of interest to provide the combining unit with a trigger signal in order to inform the combining unit which one of the grouped receive signals is currently being received. The combining unit may further be adapted to store different ones of the regrouped receive signals.

A beam forming vector is provided for at least one of the plurality of grouped payload signals. Alternatively or additionally the beam forming vector is provided for each one of the grouped receive signals.

The present invention further provides a computer program product for a manufacture of a radio system.

In yet another aspect of the invention the present invention provides a computer program product for carrying out the method according to the invention.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be also understood, that features of one aspect can be combined with features of a different aspect.

Figure 1A:
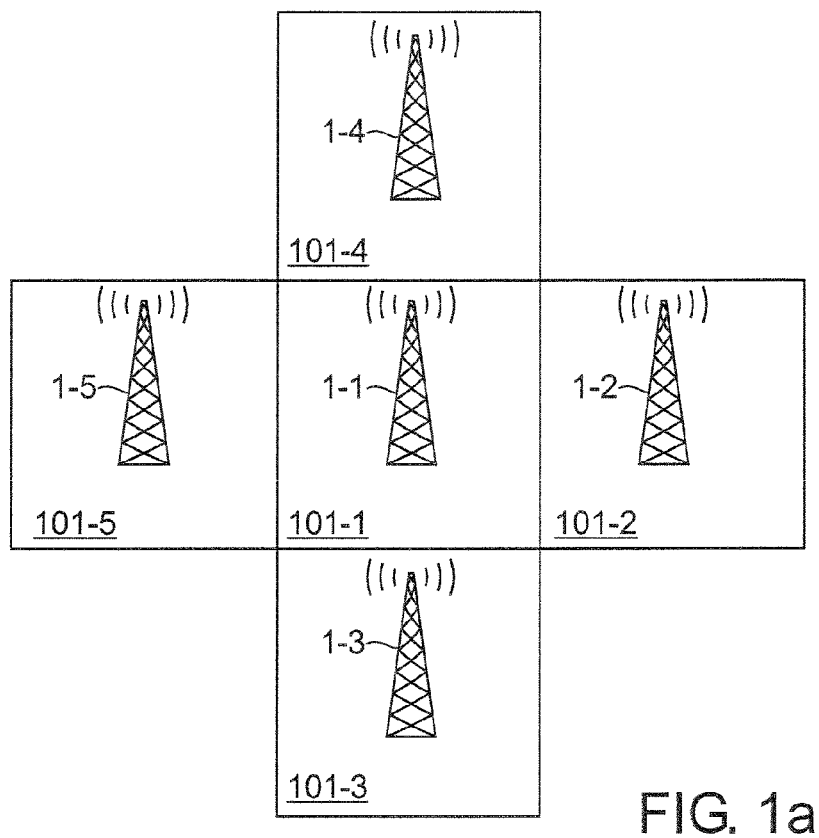
FIG. 1a shows a plurality of cells.

FIG. 1a shows a plurality of cells of a mobile network 101-1, 101-2, . . . , 101-5. Each one of the cells 101-1, 1-2, . . . , 101-5 comprises a radio system 1-1, 1-2, . . . , 1-5. The radio systems 1-1, 1-2, . . . , 1-5 of the mobile network are adapted to relay radio signals into the cells 101-1, 1-2, . . . , 101-5 of the mobile network. Typically the radio systems 1-1, 1-2, . . . , 1-5 are mounted on a base station.

Figure 1B:
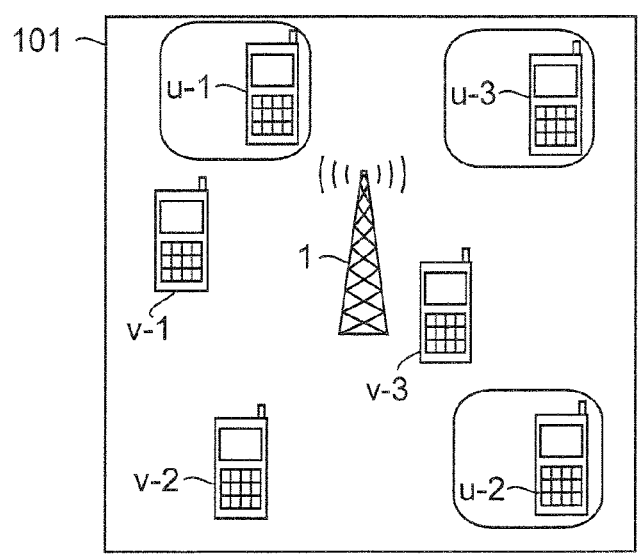
FIG. 1b shows groups of users using different services within a cell of the mobile network.

FIG. 1b shows an example of an individual one of the cells 101 of the mobile network comprising a plurality of users. The radio system 1 relays the radio signals to and from each one of the users. FIG. 1b shows users u-1, u-2, u-3 and v-1, v-2 and v-3 as an example of six different users present in the cell 101. Obviously the cell 101 of the mobile network may comprise more than six users as indicated in FIG. 1b. The radio signals relayed to individual users are present as an amount of noise and/or interferences for all the other users within the cell of the mobile network. For example a radio signal relayed from the radio system 1 to the user v-1 appears as the amount of noise and/or interferences to the other users u-1 . . . u-3, v-2 and v-3 within the cell 101 of the mobile network. Hence it is of interest to reduce the amount of noise and/or interferences present when relaying the radio signals between the radio system 1 and the individual user u-1.

Figure 2A:
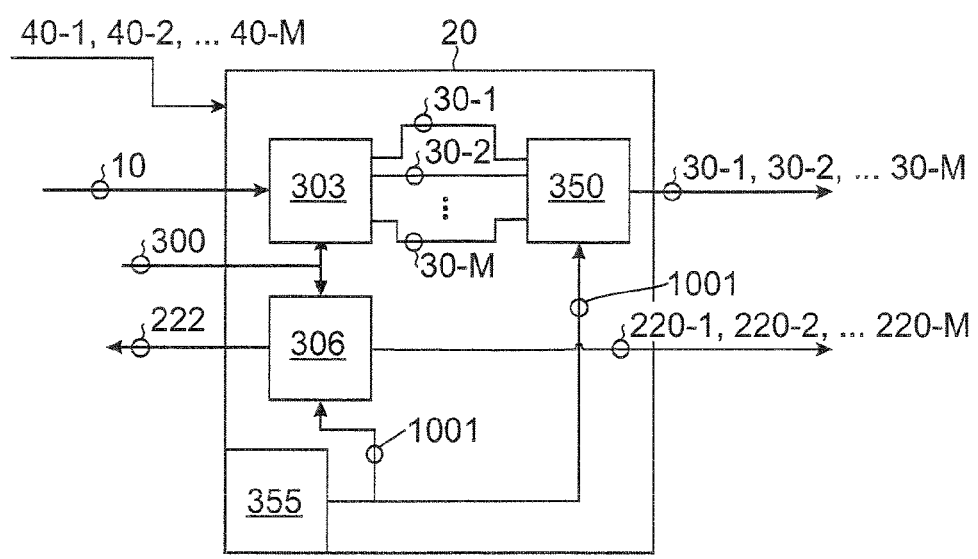
FIG. 2a shows a base band unit of a radio system.

According to the present disclosure a payload signal 10 is relayed as a plurality of grouped payload signals 30-1, 30-2, . . . , 30-M (see FIG. 2a). M denotes a number of payload signals 30-1, 30-2, . . . 30-M and hence a number of groups of users within the cell 101 of the mobile network. The grouped payload signals 30-1, 30-2, . . . , 30-M (see FIG. 2a) are generated based on a service criterion 300 for each of the users present within the cell 101 of the mobile network. The users u-1, . . . , u-3 in FIG. 1b may, for example, use data services such as HSDPA. The users v-1, v-2 and v-3 may, for example, use voice services for communicating with another person. Hence there are two groups of users present within the cell 101 of the mobile network. Different services are provided to the groups of users according to the service criterion 300. The service criterion 300 defines the group of the users for the individual user. Therefore the grouped payload signals 30-1, 30-2, . . . , 30-M are defined by the service criterion 300. Likewise grouped receive signals 220-1, 220-2, . . . , 220-M are defined by the service criterion 300.

Typically the radio system 1 is not adapted to identify the grouped receive signals 220-1, 220-2, . . . , 220-M immediately. The antenna elements (not shown) of the radio system 1 cannot distinguish between different ones of the grouped receive signals 220-1, 220-2, . . . , 220-M. A separation of the grouped receive signals 220-1, 220-2, . . . , 220-M is nevertheless conceivable at the radio system 1 but would require some sort of channel estimation. An identification of the grouped receive signals 220-1, 220-2, . . . , 220-M may be done as part of a base band processing. The grouped receive signals 220-1, 220-2, . . . , 220-M are depicted as individual signals for the sake of clarity only. It may be of interest to use identical associated beam forming vectors 40-1, 40-2, . . . , 40-M for the uplink and the downlink relaying, at least when the system starts operation. Later on user group information determined in the radio system 1 may be exploited in order to optimize the uplink beamforming accordingly, i.e. to improve user separation in uplink based on baseband information from radio system 1.

At a first point in time the radio signals are relayed to the first group of users u-1, . . . , u-3 in FIG. 1b. The second group of users v-1, v-2, v-3 are provided with the relayed radio signals at a second point in time. At the first point in time a number of users listening and responding to the relayed radio signals is reduced. In FIG. 1b at the first point in time only three of the six users present within the cell 101 of the mobile system are listening and/or responding to the radio system 1. Thus the number of radio signals that may cause the amount of noise and/or interferences is reduced. Consequently, the signal to noise ratio SNR or more precisely the SINR is improved for the first group of users u-1, u-2, u-3. Likewise the SINR is improved for the second group of users v-1, . . . , v-3 when grouping the radio signals according to the service criterion 300. A grouping of users u-1, u-2, u-3 and v-1, v-2, v-3 is provided according to the service criterion 300. The service criterion 300 comprises for example transmit power requirements, data rates, voice communication, common channels required for communication location information, channel quality, a speed at which a user is moving, and the like. It will be appreciated by a person skilled in the art that several other forms of the service criterion 300 are conceivable.

Figure 1C:
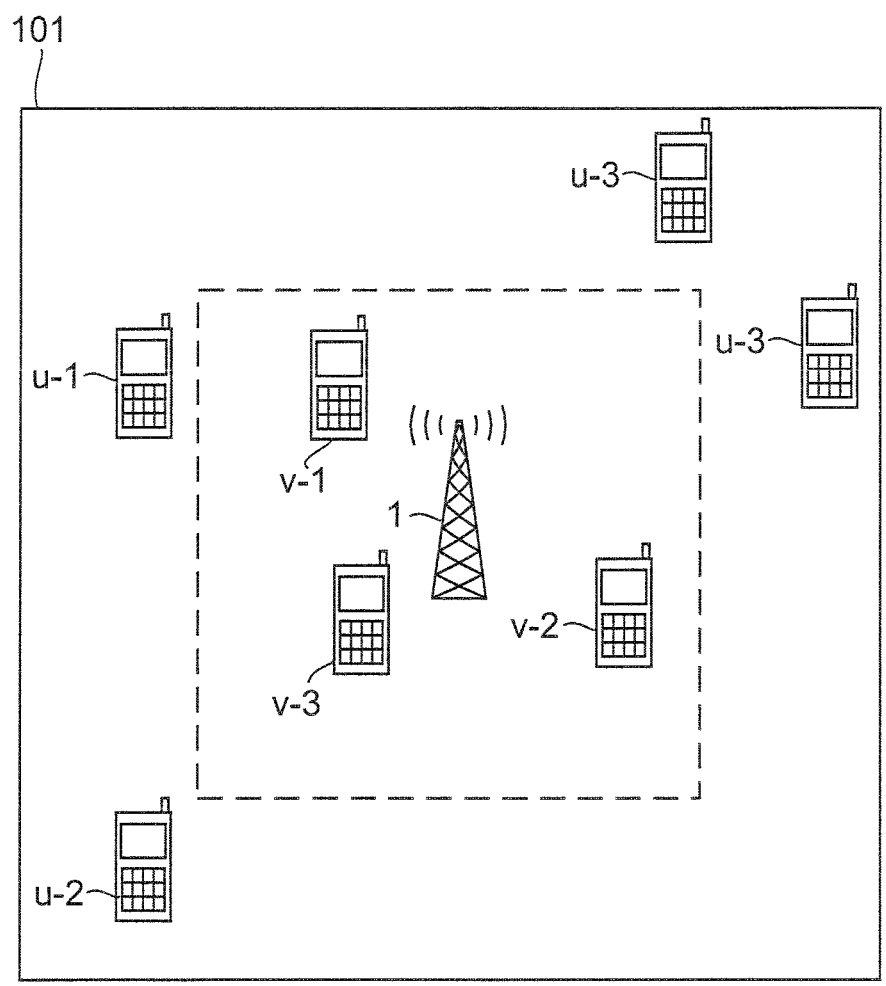
FIG. 1c shows a further example of different groups of users within the cell of the mobile network.

FIG. 1*c* shows a further example of the users within the cell 101 of the mobile network. A first group of users L-1, L-2 and L-3 are located close to the radio system 1. The first group of users L-1, . . . , L-3 requires only a low transmit power (Tx power) when relaying the signals. A second group of users H-1, H-2, H-3 and H-4 is located close to a border of the cell 101. The second group of users H-1, . . . , H-4 will also receive radio signals from adjacent cells of the mobile network (not shown). Hence the second group of users H-1, . . . , H-4 is exposed to a larger amount of noise and/or interferences from the adjacent cells of the mobile network. Therefore the SINR will be lower for the second group of users H-1, . . . , H-4 than for the first group of users L-1, . . . , L-3. The increased distance requires a higher Tx power for the second group of users H-1, . . . , H-4, in comparison to the first group of users L-1, . . . , L-3. Likewise the reduced SINR for the second group of users anticipates the higher Tx power when relaying the radio signals to the second group of users.

Another aspect of the present disclosure is to implement an overlay underlay network structure with different beam forming vectors. The overlay network structure (not shown) extends over more than one of the cells 101-1, 101-2, . . . , 101-N forming an overlay cell (not shown). The underlay network structure may comprise the cells 101-1, 101-2, 101-3 . . . , 101-N or a hot spot network (not shown) with the hot spots actually covering a smaller area than the area covered by the cells 101-1, 101-2, . . . , 101-N: It will take fast moving users H-1, H-2, H-3 longer to leave the overlay cell than the underlay cell. The overlay cell will use the beam forming vectors which are so chosen such that the area of the overlay cell is covered by the beam shape given by the beam forming vectors. An individual one of fast moving users H-1, H-2, . . . , H-3 could be assigned to the overlay cell, whereas slow moving users L-1, L-2, L-3 with high data rates could be assigned to the hot spot network. Hence an acceptable quality of service may be provided to the fast moving users H-1, H-2, H-3 and the slow moving users L-1, L-2, L-3 requiring different data rates.

For the groups of users present in FIG. 1*c* the SINR will be increased when relaying the radio signals as grouped payload signals 30-1, 30-2, . . . , 30-M; as those users not belonging to the group of the users allocated to the grouped payload 30-1, 30-2, . . . , 30-M currently relayed, remain silent. Therefore a quality of service will be improved for all the groups of users present within the cell 101 of the mobile network.

The interferences experienced by the individual user, for example L-1 in FIG. 1*c* depends on the plurality of paths for the radio signals to reach the individual user. The plurality of paths to reach the individual user changes with a movement of the individual user, i.e. L-1 within the cell 101. It is of interest for the radio system 1 to support the mobility of individual users present within the cell 101 of the mobile network and at the same time to provide an optimal quality of service to the users L-1, . . . , L-3 and H-1, . . . , H-4 within the cell 101 of the mobile network. Transmitting the radio signals to the first group of users L-1, . . . , L-3 will reduce the number of different relayed radio signals present within the cell 101 of the mobile network. Hence the amount of noise and/or interferences present is reduced within the cell 101. For the individual user L-1 there are only two further radio signals being transmitted to the users L-3 and L-2 within the same group of users. Therefore the individual user L-1 experiences only the radio signals relayed to the users L-2 and L-3 as the amount of the noise and/or interferences when communicating with the radio system 1. Therefore the SINR is increased, when providing the payload signal 30 as the plurality of the grouped payload signals 30-1, 30-2, . . . , 30-M according to the service criterion 300. The increased SINR will affect the quality of service provided by the radio system 1. Obviously the number of users present within the cell 101 may be larger than the examples shown with FIGS. 1*b* and 1*c*.

FIG. 2*a* shows a base band unit 20 according to the present disclosure. The base band unit 20 is accepts a payload signal 10. The payload signal 10 is provided in a base band frequency. The payload signal 10 comprises the payload signals that are to be relayed to the individual users present within the cell 101 of the mobile network. The payload signal 10 comprises, for example, the payload signals that are relayed to the users u-1, . . . , u-3 and v-1, . . . , v-3 within FIG. 1*b*. The base band unit 20 is further adapted to receive the service criterion 300, as explained above. Based on the service criterion 300 a splitting unit 303 generates the plurality of grouped payload signals 30-1, 30-2, . . . , 30-M. Each user of the mobile network is grouped into the groups of the users according to the service criterion 300. It is without any limitation possible for a user to be grouped into more than one user group. Consequently the radio signal to be relayed to the individual user is grouped into an individual one of the grouped payload signals 30-1, 30-2, . . . , 30-M. The grouped payload signals 30-1, 30-2, . . . , 30-M are generated for a number of user groups identified by the service criterion 300. Each one of the groups of the users is associated with a beam forming vector 40-1, 40-2, . . . , 40-M (see FIG. 2*b*).

The associated beam forming vector 40-1, 40-2, . . . , 40-M comprises factors c-1, c-2, . . . , c-N. Each of the factors c-1, c-2, . . . , c-N may be construed as an amplitude and delay or phase weighting for an individual one of the antenna elements 160-1, 160-2, . . . , 160-N. It is to be understood that in the prior art it was common to use passive delay or phase and amplitude weightings, typically provided by a passive network. A change in delay or phase and amplitude weighting and therefore a change in beam shaping is rather restricted using the passive network. No further changes were possible to the beam forming once the passive network was set up. If one wished to be more flexible one option was to provide more than one of the passive networks. The passive networks for delay or phase and amplitude weighting are typically quite expensive to manufacture, as timing and attenuating properties of the passive networks need to be set accurately in order to provide a reliable beam forming It was not possible to increase the number of beam forming vectors with the passive networks used for the beam forming in a radio system according to the prior art. With the present disclosure the beam forming vectors are provided in the form of the factors c-1, c-2, . . . , c-N. It is to be understood that the factors c-1, c-2, . . . , c-N are adjustable independently. In other words choosing a first one of the factors c-1, c-2, . . . , c-N is not to affect any of the remaining factors c-1, c-2, . . . , c-N. It is further to be understood that the factors c-1, c-2, . . . , c-N may be time varying. Furthermore it would be appreciated that a first associated beam forming vector 40-1, 40-2, . . . , 40-M may be used for the uplink relaying and a second one of the beam forming vectors 40-1, 40-2, . . . , 40-M may be used in a downlink relaying. Consequently the factors c-1, c-2, . . . , c-N used for the uplink relaying may be different from the factors c-1, c-2, . . . , c-N used for the downlink relaying.

The concept of the associated beam forming vector being represented by the independently adjustable factors c-1, c-2, . . . , c-N allows for the beam to "look" into different spatial directions for the uplink relaying and the downlink relaying.

A beam forming is carried out according to the service criterion 300 provided, i.e. the associated beam forming vector 40-1, 40-2, . . . , 40-M. A transmit combining unit 350 is adapted to combine individual ones of the grouped payload signals 30-1, 30-2, . . . , 30-M. The transmit combining unit 350 may also only forward one individual one of the grouped payload signals 30-1, 30-2, . . . , 30-M. Furthermore a combining of the individual ones of the payload signals 30-1, 30-2, . . . , 30-M may change with time. The transmit combining unit 350 forwards the individual ones of the grouped payload signals 30-1, 30-2, . . . , 30-M to a digital radio interface 100, also referred to as DRI as shall be explained further down.

The base band unit 20 further comprises a trigger source 355 adapted to provide a trigger signal 1001. The trigger signal 1001 may be used for a change of the combining in the transmit combining unit 350. The base band unit 20 is further adapted to receive a grouped receive signal 220-1, 220-2, . . . , 220-M. M denotes again the number of groups formed according to the service criterion 300.

The baseband unit 20 comprises a combining unit 306. The combining unit 306 is adapted to combine the individual ones of the grouped receive signals 220-1, 220-2, . . . , 220-M into a combined receive signal 222. The service criterion 300 may be forwarded to the combining unit 306 for combining the grouped receive signals 220-1, 220-2, . . . , 220-M into the combined receive signal 222. It may be of interest for the combining unit 306 to comprise a memory of some sort for storing the individual ones of the grouped receive signals 220-1, 220-2, . . . , 220-M. As stated previously the antenna elements 160-1, 160-2, . . . , 160-N are typically not adapted to identify the individual ones of the grouped receive signals 220-1, 220-2, . . . , 220-M. An identification of the individual ones of the receive signals 160-1, 160-2, . . . , 160-N may be carried out in the combining unit 306. It may further be of interest to provide the trigger signal 1001 to the combining unit 306 so that the combining unit "knows" which one of beam forming vectors 40-1, 40-2, . . . , 40-M is used. The individual ones of the receive signals 220-1, 220-2, . . . , 220-M comprise the receive signal for an individual one of the groups of users according to the service criterion 300.

The trigger unit 355 may use a 2 ms time slot or transmission time interval (TTI) as present within the HSDPA protocol. Without any limitation any other trigger interval may be used. The base band unit 20 as shown in FIG. 2a provides more than one grouped payload signal 30-1, 30-2, . . . , 30-M. It is to be understood that the beam forming vector 40-1, 40-2, . . . , 40-M may be provided to the base band unit 20 and the beam forming unit 44, as shown in FIG. 2b.

The base band unit 20 may be used as an individual unit coupled with the digital radio interface 200 of the active antenna system 100 as known in the art. It is possible for the base band unit 20 to be part of the radio system 1 according to the present disclosure. When the base band unit 20 is used as a standalone product, it is to be understood that the beam forming vectors 40-1, 40-2, . . . , 40-M need to be provided to the base band unit 20. More precisely the base band unit 20 needs to know which one of the user groups is associated to which one of the beam forming vectors 40-1, 40-2, . . . , 40-M. In case the base band unit 20 is combined with a radio system of the prior art, there may be a limitation with respect to the beam forming vectors that can be relayed by the active antenna system according to the prior art.

Figure 2B:
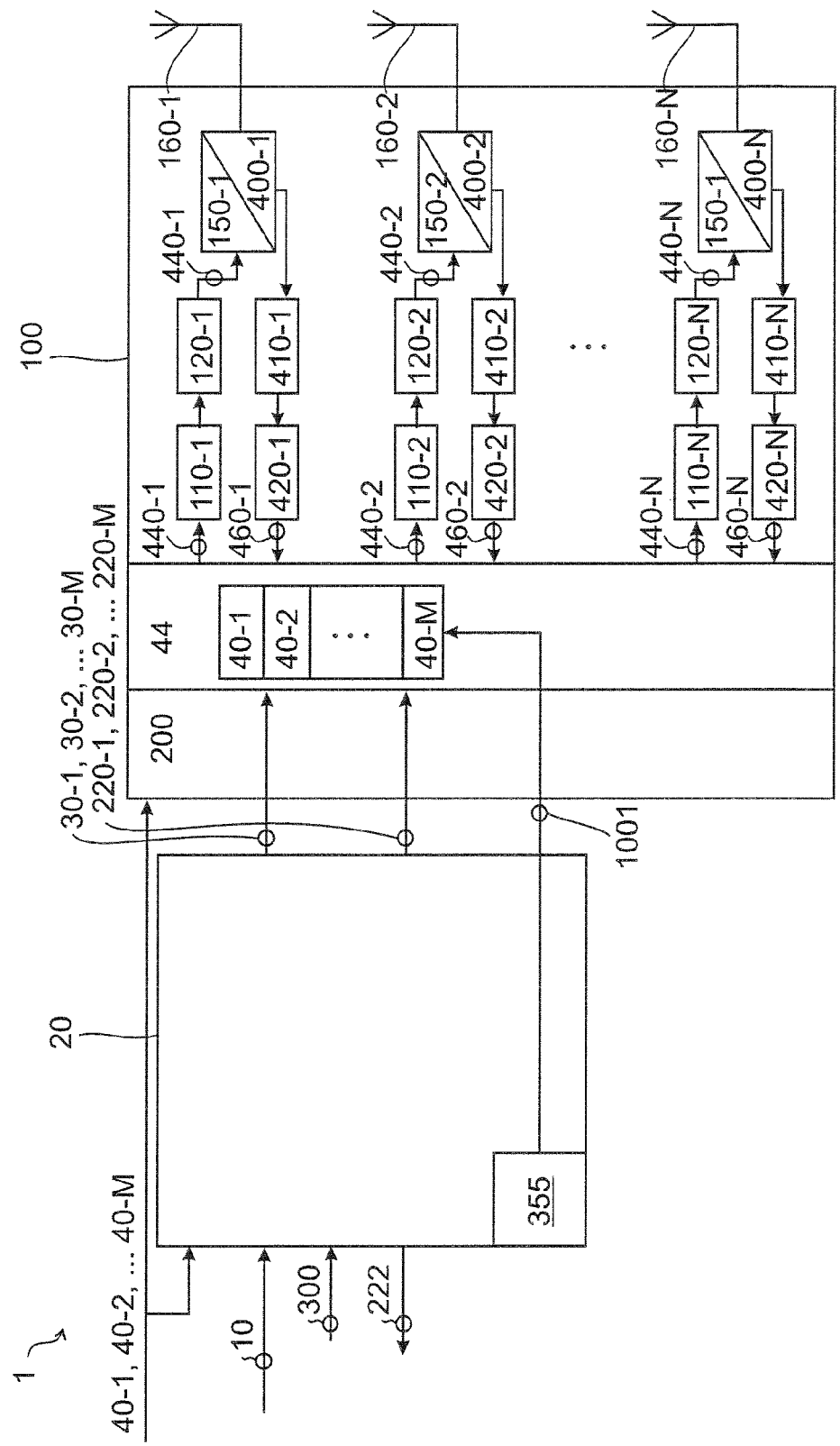
FIG. 2b shows the radio system.

FIG. 2b shows the radio system 1. The radio system 1 comprises the base band unit 20 and an active antenna system (AAS) 100. The active antenna system 100 comprises the digital radio interface 200 as is known in the art. The digital radio interface 200 is adapted to receive the payload signal 10 to be relayed by the active antenna system 100. The payload signal 10 at the digital radio interface 200 is typically provided in a format comprising an in phase component I and an out of phase component Q. The in phase component I and the out of phase component Q are provided in pairs (I, Q). It will be apparent to a person skilled in the art that also alternative ways for providing the payload signal 10 are conceivable. Such forms comprise a polar representation of the payload signal 10 and/or a circularly polarized representation of the payload signal 10. These different forms of representation are known in the art and shall not be explained any further. The digital radio interface 200 may comprise a common public radio interface CPRI and/or an open base station according to the open base station architecture initiative OBSAI. It is to be understood that the beam forming vector 40-1, 40-2, . . . , 40-M is provided to the digital radio interface DRI 200 as well, as it is shown in FIG. 2b. The active antenna system 100 further comprises a beam forming unit 44. The beam forming unit 44 is adapted to receive the grouped payload signal 30-1, 30-2, . . . , 30-M in the base band to be relayed by the active antenna system 100.

The payload signal 10 may without any limitation be provided at an intermediate frequency. The intermediate frequency may comprise any frequency band between the base band frequency of the radio system and a frequency band of transmission of the radio system 1. Therefore the provision of the payload signal 10 in the base band is an arbitrary choice of convenience only.

According to the present disclosure the payload signal forwarded to the beam forming unit 44 is the individual one of the grouped payload signals 30-1, 30-2, . . . , 30-M. Hence the base band unit 20 may be used with a standard active antenna system 100 without substantial changes required to the active antenna system 100, as mentioned above. The beam forming based on the service criterion 300 is almost transparent to the active antenna system 100. As mentioned earlier, the beam forming vectors 40-1, 40-2, . . . , 40-M need to be provided to the digital radio interface 200 and/or the base band unit 20. In other words the base band unit 20 and/or the digital radio interface DRI 200 need to "know" which beam forming vector 40-1, 40-2, . . . , 40-M is associated to a selected one of the user groups. The beam forming unit 44 is adapted to apply the factors c-1, c-2, . . . , c-N to the individual one of the grouped payload signals 30-1, 30-2, . . . , 30-M forming a plurality of individual transmit signals 440-1, 440-2, . . . , 440-N being relayed as a downlink beam shape by the active antenna system 100 with a plurality of the antenna elements 160-1, 160-2, . . . , 160-N. The beam forming unit 44 is adapted to store a plurality of beam forming vectors 40-1, 40-2, . . . , 40-M allowing a relaying of radio signals within different beam shapes into the cell 101 of the mobile network. It is to be understood that the beam forming vectors 40-1, 40-2, . . . , 40-M comprise the factors c-1, c-2, . . . , c-N. The factors may be used to "steer" the beam into different spatial areas. The beam forming vector, i.e. beam shape is defined by the factors c-1, c-2, ..., c-N. Each set of the factors c-1, c-2, ..., c-N yields a beam shape characterized by a specific shape, an azimuth angle and an inclination angle indentifying a direction of the beam shape. The applying of the factors c-1, c-2, ..., c-N to the grouped payload signals 30-1, 30-2, ..., 30-M yields a desired beam shape.

The individual transmit signals 440-1, 440-2, ..., 440-N are relayed along transmit paths of the active antenna system 100. The active antenna system 100 comprises N different transmit paths. Each transmit path is terminated by antenna elements 160-1, 160-2, ..., 160-N. Alternatively an individual one of the transmit paths may be terminated by more than one of the antenna elements 160-1, 160-2, ..., 160-N which is clearly not the standard configuration of the antenna elements 160-1, 160-2, ..., 160-N, but may be of interest with respect to a reduction of costs associated with the radio system 1.

Furthermore it is possible to assign the individual one of the factors c-1, c-2, ..., c-N to more than one of the antenna elements 160-1, 160-2, ..., 160-N. It is to be understood that the provision of the factors c-1, c-2, ..., c-N providing the weighting of signals allows forming of one or more sub arrays out of the antenna elements 160-1, 160-2, ..., 160-N. Likewise it is possible to provide combinations of the complex factors c-1, c-2, ..., c-N to an individual one of the antenna elements 160-1, 160-2, ..., 160-N: It will be appreciated that the complex factors c-1, c-2, ..., c-N provide beam shapes with more than one hot spot. In other words the beam shape can be "looking" into several directions at a time.

In FIG. 2b only three different transmit paths are shown. Nevertheless any other number N of the transmit paths is conceivable. Each one of the individual transmit paths comprises an digital to analogue converting unit 110-1, 110-2, ..., 110-N for digital to analogue converting the individual transmit signals 440-1, 440-2, ..., 440-N. The digital to analogue converting unit 110-1, 110-2, ..., 110-N may comprise a sigma delta digital to analogue converter, as is known in the art. The transmit paths further comprise a filter 120-1, 120-2, ..., 120-N for filtering the individual transmit signals 440-1, 440-2, ..., 440-N. The individual transmit signals 440-1, 440-2, ..., 440-N are amplified by a transmit amplifier 150-1, 150-2, ..., 150-N and relayed by the antenna elements 160-1, 160-2, ..., 160-N. A defined delay or phase and amplitude relation between the antenna elements 160-1, 160-2, ..., 160-N allows for the selected one of the grouped payload signals 30-1, 30-2, ..., 30-M to be relayed according to the selected beam forming vector 40-1, 40-2, ..., 40-M. As mentioned earlier the defined delay or phase and amplitude relation between the antenna element 160-1, 160-2, ..., 160-N is provided by the factors c-1, c-2, ..., c-N, representing delay or phase and amplitude weightings for each one of the antenna elements 160-1, 160-2, ..., 160-N.

The trigger unit 355 is further adapted to switch between the beam forming vectors 40-1, 40-2, ..., 40-M that are currently applied to the antenna elements 160-1, 160-2, ..., 160-N. The switching between the beam forming vectors 40-1, 40-2, ..., 40-M being currently applied may be synchronized with the changing in combining in the transmit combining unit 350, as explained with respect to FIG. 2a.

The antenna elements 160-1, 160-2, ..., 160-N are further adapted for receiving a plurality of individual receive signals 460-1, 460-2, ..., 460-N. The antenna elements 160-1, 160-2, ..., 160-N may be in the form of a combined transmit and receive antenna element (Tx/Rx). Alternatively, different sets of antenna elements may be used. A first set of the antenna elements may be used for transmitting the individual ones of the transmit signals 440-1, 440-2, ..., 440-N. The second set of the antenna element may in turns be used for receiving the individual receive signals 460-1, 460-2, ..., 460-N. The individual receive signals 460-1, 460-2, ..., 460-N are amplified by an amplifier 400-1, 400-2, ..., 400-N and forwarded along a receive path of the active antenna system 100. The receive path further comprises a filter 410-1, 410-2, ..., 410-N for filtering the individual receive signals 460-1, 460-2, ..., 460-N. The receive path further comprises a analogue to digital converter unit 420-1, 420-2, ..., 420-Nanalogue to digital converting the individual receive signal 460-1, 460-2, ..., 460-N from an RF-band into the base band. The analogue to digital converter unit 420-1, 420-2, ..., 420-N may comprise a sigma delta converter.

As mentioned before the grouped receive signal 420-1, 420-2, ..., 420-M are formed by applying a plurality of delay or phase and and/or amplitude changes to the individual receive signals 460-1, 460-2, ..., 460-N It is transparent to the active antenna system 100 that only grouped payload signal 30-1, 30-2, ..., 30-M are transmitted by the active antenna system 100. Likewise the active antenna system 100 is not aware that a plurality of grouped receive signal 220-1, 220-2, ..., 220-M are received by the active antenna system 100. The base band unit 20 according to the disclosure allows for the grouped payload signals 30-1, 30-2, ..., 30-M to be forwarded to the active antenna system 100, as explained earlier. The grouped receive signal 220-1, 220-2, ..., 220-M received by the active antenna system 100 may be separated by the base band unit 20 without substantial changes being necessary to the active antenna system 100. In other words the active antenna system 100 is almost blind to the relaying of grouped payload signals according to the present invention, as explained above.

The user group specific beam forming may also be provided in combination with the passive network to provide delay or phase and amplitude weightings to the grouped receive signals 410-1, 410-2, ..., 410-N and/or the grouped transmit signals 440-1, 440-2, ..., 440-N. Using the beam forming vectors, as explained above allows a more flexible user group specific beam shaping. Nevertheless it may be of interest to provide the user group specific beam forming using various passive networks in order to provide the user group specific beam shape. It is to be understood that each one of the passive networks would correspond to one set of the factors c-1, c-2, ..., c-N representing the associated beam forming vectors 40-1, 40-2, ..., 40-M. If one was to use a passive network, the factors representing the passive network would no longer be adjustable, independently. Therefore it is of advantage to provide the beam forming vectors 40-1, 40-2, ..., 40-M such that the factors c-1, c-2, ..., c-N are independently adjustable, as explained above. It is convenient to provide the trigger signal 1001 to the beam forming unit 44. Using the passive networks the active antenna system 100 would realise the switching between the beam forming vectors 40-1, 40-2, ..., 40-M as a switching between the passive networks. Hence the present invention may even be implemented in a standard radio systems using the passive networks with only very little hardware changes required in order to improve the quality of service by the user group specific beam forming according to the service criterion 300 with the present disclosure.

A radio signal within the UMTS protocol comprises different active channels AxC. It is conceivable that a single AxC is used to transmit the selected one of the grouped payload signals 30-1, 30-2, . . . , 30-M. Additionally, the trigger signal 1001 may be transferred to the beam forming unit 44 using one of the control channels provided with the protocol used for the radio signals transmitted by the radio system 1. Furthermore beam forming vectors 40-1, 40-2, . . . , 40-M could be transferred using the control channels provided at the DRI 200, so that the beam forming vectors, i.e. the associated beam forming vectors 40-1, 40-2, . . . , 40-M are adjustable at the DRI 200 and communicated from the DRI 200 to the beam forming unit 44 of the active antenna system 100.

Figure 3A:
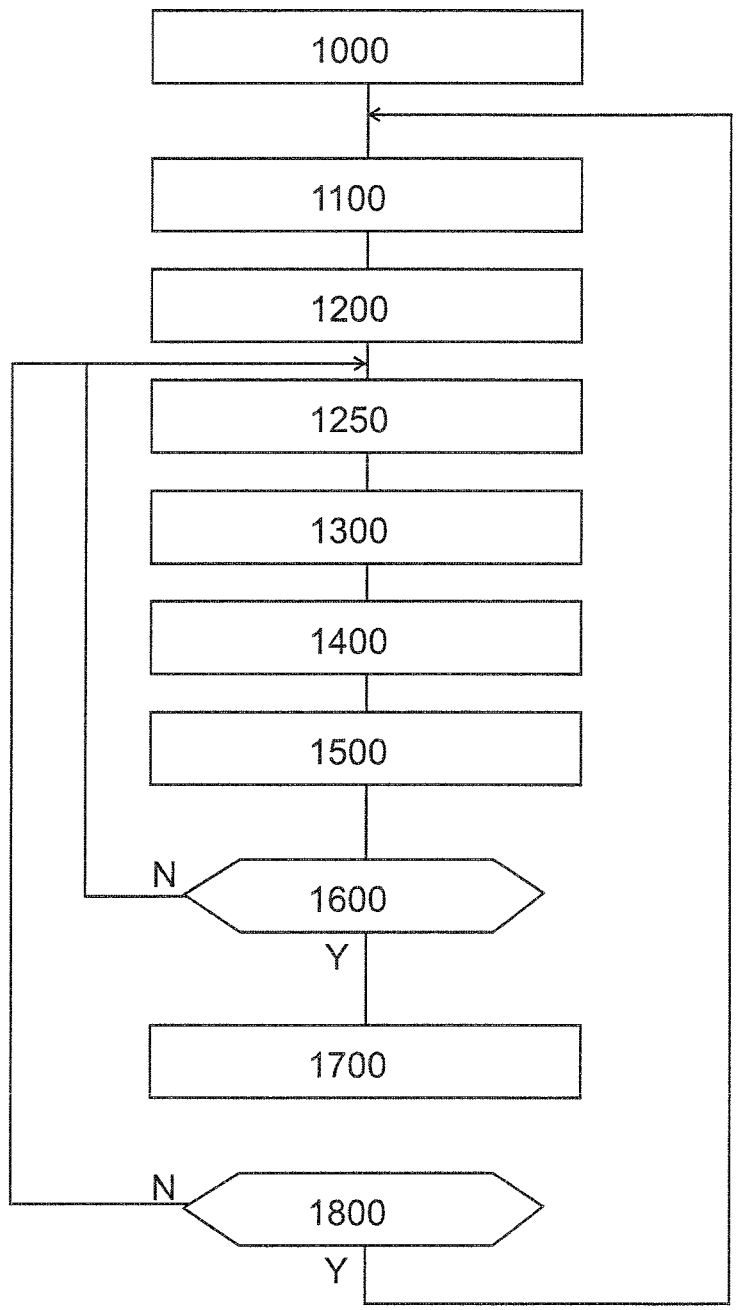
FIG. 3a shows a method for relaying radio signals within the cell of the mobile network.

FIG. 3a shows a method 1000 for relaying radio signals in a cell of a mobile network as a flowchart. A step 1100 comprises providing the payload signal 20. The payload signal 20 is provided in the base band and provided to the base band unit 20 of the present disclosure. Although the base band unit 20 is displayed within FIG. 2b as an individual object the base band unit 20 may nevertheless form part of the radio system 1. As mentioned before the base band signal may be provided in the base band or any other frequency band different from the band of transmission and reception of the radio system 1.

In a step 1200 the grouped payload signals 30-1, 30-2, . . . , 30-M are generated based on the service criterion 300. As explained above the service criterion 300 may be in the form of transmit power requirements, voice services, data communication services, location based services and the like. Again, it will be appreciated by a person skilled in the art that several other service criterions 300 are conceivable.

In a step 1250 a beam forming vector 40-1, 40-2, . . . , 40-M is selected. In a step 1300 the selected one of the grouped payload signals 30-1, 30-2, . . . , 30-M is transmitted according to the selected beam forming vector 40-1, 40-2, . . . , 40-M. As each one of the groups of users is allocated an individual one of the beam forming vectors 40-1, 40-2, . . . , 40-M. It is sufficient to select 1250 a beam forming vector 40-1, 40-2, . . . , 40-M. By selecting 1250 the beam forming vector 40-1, 40-2, . . . , 40-M, the grouped payload signals 30-1, 30-2, . . . , 30-M are as well selected. As mentioned before the associated beam forming vector or the individual one of the beam forming vectors 40-1, 40-2, . . . , 40-M comprises the factors c-1, c-2, . . . , c-N representing delay or phase and amplitude weightings applied to individual ones of the antenna elements 160-1, 160-2, . . . , 160-N The beam forming vector 40-1, 40-2, . . . , 40-M may generate a beam shape comprising one or more points of maximum intensity. This is due to the liberty in adjusting the factors c-1, c-2, . . . c-N independently, as stated earlier.

In a step 1300 the selected one of the plurality of grouped payload signals 30-1, 30-2, . . . , 30-M is transmitted according to the selected beam forming vector 40-1, 40-2, . . . , 40-M. As stated previously more than one of the grouped payload signals 30-1, 30-2, . . . , 30-M may be transmitted at a time. The selected beam forming vector 40-1, 40-2, . . . , 40-M may comprise the more than one point of maximum intensity.

In a step 1400 the selected one of the plurality of the grouped receive signals 220-1, 220-2, . . . , 220-M is received. More precisely the selected one of the plurality of the grouped receive signals 220-1, 220-2, . . . , 220-M is extracted out of all individual receive signals 460-1, 460-2, . . . , 460-N. A step 1500 comprises a saving of the selected one of the plurality of the grouped receive signals 220-1, 220-2, . . . , 220-M. The saving may be carried out using the combining unit 306 as shown in FIG. 2a. Therefore it maybe of interest to provide the combining unit 306 with a memory for saving the grouped receive signals 220-1, 220-2, . . . , 220-M.

In a step 1600 it is counted how many of the grouped receive signal 220-1, 220-2, . . . , 220-M have been saved. Let #saved be a number of grouped receive signals 220-1, 220-2, . . . , 220-M saved. A condition for a sufficient number of the grouped receive signals 220-1, 220-2, . . . , 220-M saved may be formulated as:

saved mod M=0

If the condition is fulfilled a step 1700 is carried out. If the condition is not fulfilled in the step 1600, the method returns to the step 1250.

In the step 1700 a global receive signal 222 is formed out of the grouped receive signals 220-1, 220-2, . . . , 220-N saved. The global receive signal 222 corresponds to signals received by all the user groups. In other word the global receive signal 222 comprises the receive signals from all the users present within the cell 101 of the mobile network. As mentioned before use of the user group specific beam forming is transparent at the terminals of the base band unit 20. As mentioned before it may be necessary to provide the beam forming vectors 40-1, 40-2, . . . , 40-M to the base band unit 20 and/or the digital radio interface DRI 200. It is to be noted that the complete payload signal 10 is forwarded to the base band unit 20. Likewise the combined receive signal 222 comprises all the grouped received signals 220-1, 220-2, . . . , 220M for all M groups of the users.

In step 1800 it is checked whether a change of the service criterion 300 is requested. In case the change of the service criterion 300 is requested, the method returns to the step 1100. In case no change of the service criterion 300 is requested, the method returns to the step 1250. The change in the service criterion 300 may be of interest to adapt the user group selection to different traffic situations within the cell 101 of the mobile network. Different ones of the service criterion 300 may for example be used at night times and during day time.

Figure 3B:
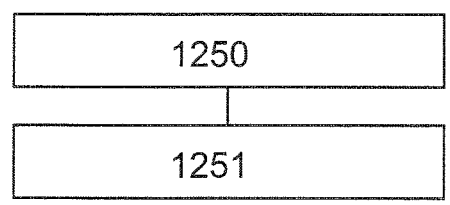
FIG. 3b shows details of the switching according to the method.

FIG. 3b shows further details of the step 1250 of the selecting. The selecting 1250 maybe trigged by the trigger signal 1001. The selecting 1250 comprises a step 1251 of combining using the transmit combining unit 350. The combining 1251 may forward only one of the individual ones of the grouped payload signals 30-1, 30-2, . . . , 30-M to the antenna elements 160-1, 160-2, . . . , 160-N. Likewise more than one of the grouped payload signals 30-1, 30-2, . . . , 30-M may be forwarded to the antenna elements 160-1, 160-2, . . . , 160-M. In other words several ones of the grouped payload signals 30-1, 30-2, . . . , 30-M may be transmitted by the antenna elements 160-1, 160-2, . . . , 160-N at any point in time. As mentioned previously the beam forming vector may comprise more than one point of maximum intensity. The step 1251 may be carried out in synchronisation with the trigger signal 1001.

Figure 3C:
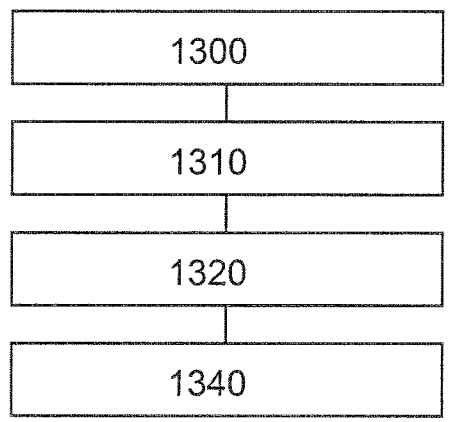
FIG. 3c shows details of the transmitting according to the method.

FIG. 3c shows the step of transmitting 1300 in more detail. In a step 1310 the factors c-1, c-2, . . . , c-N of the associated beam forming vector 40-1, 40-2, . . . , 40-M are applied to the individual one of the grouped transmit signals 220-1, 220-2, . . . , 220-M. The individual transmit signals 440-1, 440-2, . . . , 440-N are relayed by the antenna elements 160-1, 160-2, . . . , 160-N. In a step 1320, the plurality of the individual transmit signals 440-1, 440-2, . . . , 440-N are up converted. The up converting 1320 maybe carried out using a Sigma Delta digital to analogue converter. The up converting 1320 is known in the art and shall not be explained any further. A step 1330 comprises filtering the individual transmit signals 440-1, 440-2, ..., 440-N. A step 1340 comprises amplifying the individual transmit signals 440-1, 440-2, ..., 440-N.

Figure 3D:
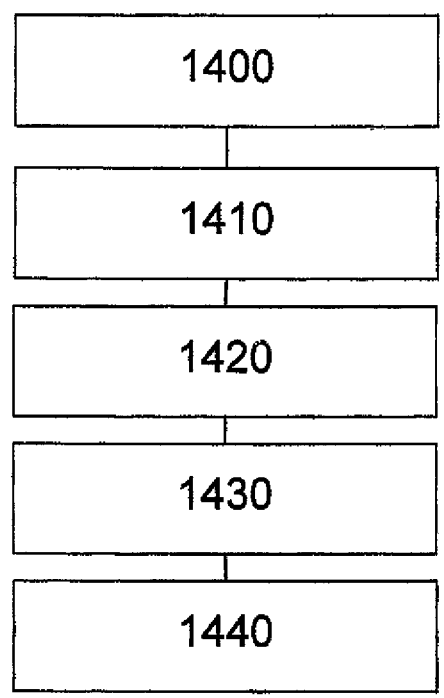
FIG. 3d shows details of the receiving according to the method.

FIG. 3d shows the step of receiving 1400 in more detail. In a step 1410 the factors c-1, c-2, ..., c-N are applied to the individual receive signals 460-1, 460-2, ..., 460-N. It is to be understood that the factors c-1, c-2, ..., c-N used for the uplink relaying may be different from the factors c-1, c-2, ..., c-N used for the downlink relaying. The applying 1410 is carried out according to the associated beam forming vector 40-1, 40-2, ..., 40-M. The selected one of the grouped receive signals 220-1, 220-2, ..., 220-N is formed by applying 1410 the factors c-1, c-2, ..., c-N. As mentioned before the factors c-1, c-2, ..., c-N are independently adjustable.

In a step 1420 the individual received signals 460-1, 460-2, ..., 460-N are amplified using the amplifier 400-1, 400-2, ..., 400-N as known in the art. A step 1430 comprises a filtering of the individual received signals 460-1, 460-2, ..., 460-N. The filtering 1430 is known in the art and shall not be discussed in more detail. A step 1440 comprises a analogue to digital converting of the individual received signals 460-1, 460-2, ..., 460-N. The analogue to digital converting 1440 maybe carried out using the sigma delta analogue to digital converter.

While various embodiments of the present invention have been described above, it should be understood that they have been presented by way of example, and not limitation. It will be apparent to persons skilled in the relevant arts that various changes in form and detail can be made therein without departing from the scope of the invention. For example, any bipolar transistors depicted in the drawings and/or described in the text could be field effect transistors, and vice versa. The resonators need not be a LC-type resonator, but also any other type of suitable resonator, such as a tank or a surface wave resonator. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A radio system for relaying radio signals in a cell of a mobile network, the radio system comprising:
   a base band unit for generating a plurality of grouped cellular radio signals from a cellular radio payload signal;
   a beam forming unit for providing a beam shape based on a plurality of beam forming vectors for yielding a beam shape characterized by a specific shape, an azimuth angle and an inclination angle identifying a direction of the beam shape;
   an active antenna system comprising a plurality of antenna elements for relaying the plurality of the grouped payload cellular radio signals according to one of the plurality of beam forming vectors associated with the grouped cellular radio payload signals;
   a transmit combining unit for combining individual ones of the plurality of the grouped cellular radio payload signals; and
   a trigger unit for providing a trigger signal to the transmit combining unit, the trigger signal comprising an indication of which one of the plurality of beam forming vectors is used, wherein the trigger unit and the trigger signal are used for a change of the combining in the transmit combining unit and a time slot corresponding to a transmission time interval as present within a communication protocol used for the trigger signal, wherein the grouped payload cellular radio signals are grouped according to a network-determined service criterion, wherein the associated beam forming vector comprises factors for at least one of the antenna elements; and wherein the factors are independently selectable.

2. The radio system according to claim 1, wherein the associated beam forming vector is different for an uplink relaying and a downlink relaying of the radio system.

3. The radio system according to claim 1, wherein the associated beam forming vector is time varying.

4. The radio system according to claim 1, wherein the associated beam forming vector is adjustable at a digital radio interface.

5. The radio system according to claim 1, wherein the network-determined service criterion is at least one of: transmit power requirements, data rates, voice communication, common channels required.

6. The radio system according to claim 1, wherein each of the grouped payload cellular radio signals is associated to an individual associated beam forming vector.

7. The radio system according to claim 1, wherein the base band unit further comprises a splitting unit for splitting the payload cellular radio signal into the plurality of the grouped payload cellular radio signal.

8. The radio system according to claim 1, wherein the base band unit further comprises a combining unit for forming a combined receive signal from at least one of the plurality of the grouped receive signals.

9. The radio system according to claim 1, wherein the beam forming unit is adapted to apply the factors to the grouped cellular radio payload signal thus forming a plurality of individual transmit signals according to the associated beam forming vector used for a downlink relaying.

10. The radio system according to claim 9, wherein the beam forming unit is further adapted to apply the factors to a plurality of individual receive signals received at individual ones of the plurality of the antenna elements, wherein the factors are applied according to the associated beam forming vector used for an uplink relaying yielding the plurality of the grouped receive signals.

11. The radio system according to claim 1, wherein the active antenna system comprises a digital to analogue converter for digital to analogue converting the plurality of the individual transmit signals.

12. The radio system according to claim 11, wherein the digital to analogue converter comprises a sigma delta digital to analogue converter.

13. The radio system according to claim 9, wherein the active antenna system further comprises a filter for filtering the plurality of the individual transmit signals.

14. The radio system according to claim 1, wherein the active antenna system further comprises an amplifier for amplifying the plurality of the individual transmit signals.

15. The radio system according to claim 1, wherein the plurality of antenna elements is adapted to transmit the plurality of the individual transmit signals.

16. The radio system according to claim 1, wherein the active antenna system further comprises an amplifier for amplifying a plurality of individual receive signals.

17. The radio system according to claim 1, wherein the active antenna system further comprises a filter for filtering the plurality of the individual receive signals.

18. The radio system according to claim 1, wherein the active antenna system further comprises a analogue to digital converter for analogue to digital converting the plurality of the individual receive signals.

19. The radio system according to claim 18, wherein the analogue to digital converter comprises a sigma delta analogue to digital converter.

20. The radio system according to claim 1, wherein each of the grouped cellular radio payload signals comprises at least one antenna carrier.

21. The radio system according to claim 1, further comprising a digital signal processer (DSP).

22. The radio system according to claim 9, wherein at least one of the following elements is implemented on a chip: the base band unit and the beam forming unit.

23. The radio system according to claim 22, wherein the chip comprises the digital signal processor (DSP).

24. A method for relaying radio signals in a cell of a mobile network, the method comprising:
providing a cellular radio payload signal,
generating a plurality of grouped cellular radio payload signals based on a network-determined service criterion,
selecting an associated beam forming vector for providing a beam shape characterized by a specific shape, an azimuth angle and an inclination angle identifying a direction of the beam shape, wherein the selecting is trigged by a trigger signal transmitted to a transmit combining unit and indicating which one of the plurality of beam forming vectors is used, using the trigger unit and the trigger signal for a change of the combining in the transmit combining unit and using a time slot corresponding to a transmission time interval as present within a communication protocol for the trigger signal;
transmitting a selected one of the plurality of the grouped cellular radio payload signals according to the selected beam forming vector;
wherein the plurality of the grouped cellular radio payload signals are grouped according to the network-determined service criterion, wherein the associated beam forming vector comprises factors for at least one of the antenna elements; and
wherein the factors are independently selectable.

25. The method according to claim 24, wherein the associated beam forming vector is different for an uplink relaying and a downlink.

26. The method according to claim 24, the method further comprising:
receiving a plurality of grouped receive signals,
saving a selected one of the plurality of grouped receive signals.

27. The method according to claim 26, the method further comprising:
counting the grouped receive signals saved,
combining a combined receive signal from the grouped receive signals saved when a result of the counting equals a value.

28. The method according to claim 24, further comprising:
checking for a change of the service criterion.

29. The method according to claim 24, wherein the selecting comprises:
combining individual ones of the plurality of the grouped cellular radio payload signals.

30. The method according to claim 24, wherein the transmitting comprises:
applying the factors to the individual one of the grouped transmit signals thus forming a plurality of individual transmit signals, according to the associated beam forming vector used for a downlink relaying.

31. The method according to claim 30, wherein the transmitting further comprises:
up converting the plurality of the individual transmit signals,
filtering the plurality of the individual transmit signals,
amplifying the plurality of the individual transmit signals.

32. The method according to claim 28, wherein the receiving comprises:,
applying the factors to a plurality of individual receive signals according to the associated beam forming vector used for an uplink relaying, generating the selected one of the plurality of the grouped receive signals.

33. The method according to claim 32, wherein the receiving further comprises:
amplifying a plurality of individual receive signals,
filtering the plurality of the individual receive signals,
analogue to digital converting the plurality of the individual receive signals.

34. Computer program product embodied on a non-transitory computer-readable medium and the non-transitory computer-readable medium comprising instructions that enable a processor to carry out the method, the method comprising:
providing a cellular radio payload signal,
generating a plurality of grouped cellular radio payload signals based on a service criterion,
selecting an associated beam forming vector for providing a beam shape characterized by a specific shape, an azimuth angle and an inclination angle identifying a direction of the beam shape, wherein the selecting is trigged by a trigger signal transmitted to a transmit combining unit and indicating which one of the plurality of beam forming vectors is used, using the trigger unit and the trigger signal for a change of the combining in the transmit combining unit and using a time slot corresponding to a transmission time interval as present within a communication protocol for the trigger signal;

transmitting a selected one of the plurality of the grouped cellular radio payload signals according to the selected beam forming vector;

wherein the plurality of the grouped cellular radio payload signals are grouped according to a network-determined service criterion, wherein the associated beam forming vector comprises factors for at least one of the antenna elements; wherein the factors are independently selectable;

wherein the associated beam forming vector comprises factors for at least one of the antenna elements; and wherein the factors are independently selectable.

* * * * *

UNITED STATES PATENT AND TRADEMARK OFFICE
CERTIFICATE OF CORRECTION

PATENT NO. : 9,584,199 B2
APPLICATION NO. : 12/563638
DATED : February 28, 2017
INVENTOR(S) : Schlee et al.

Page 1 of 2

It is certified that error appears in the above-identified patent and that said Letters Patent is hereby corrected as shown below:

On the Title Page

Item [57], Column 2, Line 9, delete "(30-1, . . ., 30-M)" and insert -- (30-1, 30-2, . . ., 30-M) --, therefor.

In the Specification

Column 1, Line 8, delete "entitled;" and insert -- entitled: --, therefor.

Column 2, Line 13, delete "Time division multiplexing architectures" and insert -- Time-division multiple access --, therefor.

Column 2, Line 35, delete "System" and insert -- System) --, therefor.

Column 2, Line 59, delete "forming" and insert -- forming. --, therefor.

Column 3, Line 43, delete "forming" and insert -- forming. --, therefor.

Column 3, Line 52, delete "at a the" and insert -- at the --, therefor.

Column 4, Line 27, delete "The the term" and insert -- The term --, therefor.

Column 4, Line 47, delete "is than" and insert -- is then --, therefor.

Column 5, Line 11, delete "unit which" and insert -- unit in which --, therefor.

Column 5, Line 27, delete "FIG. 1ashows" and insert -- FIG. 1a shows --, therefor.

Column 6, Line 5, delete "u-1 . . . u-3," and insert -- u-1 . . ., u-3, --, therefor.

Signed and Sealed this
Eighth Day of June, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 9,584,199 B2

Column 6, Line 13, delete "30-2, . . ." and insert -- 30-2, . . ., --, therefor.

Column 8, Line 14, delete "20 is accepts" and insert -- 20 accepts --, therefor.

Column 8, Line 53, delete "forming" and insert -- forming. --, therefor.

Column 12, Line 20, delete "460-N" and insert -- 460-N. --, therefor.

Column 13, Line 57, delete "comprise the more" and insert -- comprise more --, therefor.

In the Claims

Column 17, Line 42, Claim 21, delete "processer" and insert -- processor --, therefor.

Column 17, Line 50, Claim 24, delete "signal," and insert -- signal; --, therefor.

Column 17, Lines 52-53, Claim 24, delete "criterion," and insert -- criterion; --, therefor.

Column 18, Line 41, Claim 32, delete "comprises:," and insert -- comprises: --, therefor.

Column 18, Line 57, Claim 34, delete "signal," and insert -- signal; --, therefor.

Column 17, Line 59, Claim 34, delete "criterion," and insert -- criterion; --, therefor.